US009696940B1

(12) United States Patent
Neumann et al.

(10) Patent No.: US 9,696,940 B1
(45) Date of Patent: Jul. 4, 2017

(54) TECHNIQUE FOR VERIFYING VIRTUAL MACHINE INTEGRITY USING HYPERVISOR-BASED MEMORY SNAPSHOTS

(71) Applicant: Raytheon Company, Waltham, MA (US)

(72) Inventors: Matthew D. Neumann, Rowlett, TX (US); Irby J. Thompson, Jr., Washington, DC (US); Michael Simms, Indialantic, FL (US)

(73) Assignee: Forcepoint Federal LLC, Herndon, VA (US)

( * ) Notice: Subject to any disclaimer, the term of this patent is extended or adjusted under 35 U.S.C. 154(b) by 505 days.

(21) Appl. No.: 14/101,257

(22) Filed: Dec. 9, 2013

(51) Int. Cl.
*G06F 12/00* (2006.01)
*G06F 3/06* (2006.01)

(52) U.S. Cl.
CPC ............ *G06F 3/065* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,219,219 B1 | 5/2007 | Wisor | |
| 8,046,550 B2 * | 10/2011 | Feathergill | G06F 11/1466 711/162 |
| 8,239,646 B2 * | 8/2012 | Colbert | G06F 3/0617 711/161 |
| 8,458,419 B2 * | 6/2013 | Basler | G06F 11/1464 711/161 |
| 8,826,273 B1 | 9/2014 | Chen | |
| 8,910,238 B2 | 12/2014 | Lukacs et al. | |
| 2005/0086523 A1 | 4/2005 | Zimmer et al. | |
| 2009/0007100 A1 * | 1/2009 | Field | G06F 21/53 718/1 |
| 2009/0119538 A1 | 5/2009 | Scales et al. | |
| 2009/0300076 A1 * | 12/2009 | Friedman | G06F 11/3664 |
| 2010/0088745 A1 * | 4/2010 | Song | G06F 21/51 726/2 |
| 2010/0107158 A1 * | 4/2010 | Chen | G06F 11/1438 718/1 |
| 2010/0281273 A1 | 11/2010 | Lee et al. | |

(Continued)

OTHER PUBLICATIONS

Office Action dated May 19, 2016 in connection with U.S. Appl. No. 14/101,166, 38 pgs.

(Continued)

*Primary Examiner* — Mark Giardino, Jr.
*Assistant Examiner* — Tasnima Matin

(57) ABSTRACT

A method includes receiving a request at a hypervisor from an application, where the application and the hypervisor are executed by a computing node. The request identifies a memory location in a memory device of the computing node, and the memory location is associated with a virtual machine executed by the computing node. The method also includes obtaining a snapshot of contents of the memory location in the memory device, where the snapshot is obtained by the hypervisor directly from the memory device. The method further includes providing the snapshot to the application. The application could form part of a second virtual machine that is executed by the computing node.

21 Claims, 4 Drawing Sheets

(56) References Cited

U.S. PATENT DOCUMENTS

| | | | |
|---|---|---|---|
| 2011/0197205 A1* | 8/2011 | Wagner | G06F 9/542 |
| | | | 719/316 |
| 2011/0265081 A1 | 10/2011 | Lucovsky et al. | |
| 2011/0265182 A1* | 10/2011 | Peinado | G06F 21/566 |
| | | | 726/24 |
| 2011/0302415 A1 | 12/2011 | Ahmad et al. | |
| 2012/0011509 A1* | 1/2012 | Husain | G06F 9/5088 |
| | | | 718/1 |
| 2012/0030672 A1 | 2/2012 | Zygmuntowicz et al. | |
| 2012/0255010 A1 | 10/2012 | Sallam | |
| 2012/0266209 A1 | 10/2012 | Gooding et al. | |
| 2012/0266231 A1 | 10/2012 | Spiers et al. | |
| 2012/0266252 A1 | 10/2012 | Spiers et al. | |
| 2012/0324236 A1* | 12/2012 | Srivastava | G06F 21/64 |
| | | | 713/189 |
| 2013/0061096 A1 | 3/2013 | McCoy | |
| 2013/0232486 A1 | 9/2013 | Chen et al. | |
| 2013/0340077 A1* | 12/2013 | Salsamendi | G06F 9/45558 |
| | | | 726/23 |
| 2014/0006803 A1 | 1/2014 | Bodis et al. | |
| 2014/0032920 A1 | 1/2014 | Gehrmann et al. | |
| 2014/0075522 A1 | 3/2014 | Paris et al. | |
| 2014/0075568 A1 | 3/2014 | Sathyadevan et al. | |
| 2014/0215461 A1 | 7/2014 | Laor et al. | |
| 2014/0310704 A1* | 10/2014 | Cantu | G06F 9/45558 |
| | | | 718/1 |
| 2014/0325644 A1 | 10/2014 | Oberg et al. | |
| 2014/0380425 A1 | 12/2014 | Lockett et al. | |
| 2015/0199518 A1 | 7/2015 | Tokumoto | |

OTHER PUBLICATIONS

Advisory Action dated Aug. 16, 2016 in connection with U.S. Appl. No. 14/101,166, 7 pages.
Office Action dated Oct. 7, 2015 in connection with U.S. Appl. No. 14/101,166, 23 pages.
Office Action dated Sep. 3, 2015 in connection with U.S. Appl. No. 14/101,130, 9 pages.
Final Office Action dated Jan. 22, 2016 in connection with U.S. Appl. No. 14/101,130, 10 pages.
International Search Report dated Sep. 26, 2013 in connection with International Patent Application No. PCT/US2013/046481, 5 pages.
Written Opinion of International Searching Authority dated Sep. 26, 2013 in connection with International Patent Application No. PCT/US2013/046481, 7 pages.
Litty, et al.; "Manitou: A Layer-Below Approach to Fighting Malware"; Dept of Computer Science, University of Toronto; Oct. 21, 2006; XP055079350; pp. 6-11.
Specification titled "Methods and Apparatuses for Monitoring Activities of Virtual Machines" filed May 7, 2013; U.S. Appl. No. 13/888,849; 16 pages.
Raytheon Pikewerks Corporation; Second Look; 2013; http//secondlookforensics.com/; 28 pages.
Specification titled "Secure Cloud Hypervisor Monitor" filed Feb. 19 2013; U.S. Appl. No. 13/770,664; 19 pages.

\* cited by examiner

TECHNIQUE FOR VERIFYING VIRTUAL MACHINE INTEGRITY USING HYPERVISOR-BASED MEMORY SNAPSHOTS

TECHNICAL FIELD

This disclosure is generally directed to computing security. More specifically, this disclosure is directed to a technique for verifying virtual machine integrity using hypervisor-based memory snapshots.

BACKGROUND

Computing clouds are increasingly used to provide computing services to client devices. A computing cloud could be used by an organization to provide computing services to internal users of that organization and/or to external users and organizations. In a conventional computing cloud, multiple computing nodes are connected together in a network, and each computing node can execute a "hypervisor." A hypervisor is software and/or hardware that is used to create and manage virtual machines. Each hypervisor supports a virtualization layer, and one or more virtual machines can be executed within the virtualization layer by each computing node. A virtual machine could include an operating system (referred to as a "guest" operating system) and one or more additional software applications that provide desired functionality. It is possible for a single computing node in a computing cloud to execute one or more virtual machines, including multiple virtual machines associated with different guest operating systems.

As is typical with computing clouds, specific virtual machines are not usually bound to particular computing nodes. Rather, each time a client device requests execution of a specific virtual machine, a computing node with adequate resources within the computing cloud could be selected to execute that specific virtual machine.

Security is a constant concern in cloud computing environments. For example, virtual machines executed on a number of computing nodes in a cloud computing environment could become infected with malware, subjected to illicit access, or otherwise compromised.

SUMMARY

This disclosure provides a technique for verifying virtual machine integrity using hypervisor-based memory snapshots.

In a first embodiment, a method includes receiving a request at a hypervisor from an application, where the application and the hypervisor are executed by a computing node. The request identifies a memory location in a memory device of the computing node, and the memory location is associated with a virtual machine executed by the computing node. The method also includes obtaining a snapshot of contents of the memory location in the memory device, where the snapshot is obtained by the hypervisor directly from the memory device. The method further includes providing the snapshot to the application.

In a second embodiment, an apparatus includes at least one memory and at least one processing device configured to execute a virtual machine, a hypervisor, and an application. The at least one processing device is configured when executing the hypervisor to receive a request from the application, where the request identifies a memory location in the at least one memory and the memory location is associated with the virtual machine. The at least one processing device is also configured when executing the hypervisor to obtain a snapshot of contents of the memory location in the at least one memory directly from the at least one memory and provide the snapshot to the application.

In a third embodiment, a non-transitory computer readable medium stores computer readable program code. The computer readable program code when executed causes a computing node to receive a request at a hypervisor from an application, where the application and the hypervisor are executed by the computing node. The request identifies a memory location in a memory device of the computing node, and the memory location is associated with a virtual machine executed by the computing node. The computer readable program code when executed also causes the computing node to obtain a snapshot of contents of the memory location in the memory device and provide the snapshot to the application, where the snapshot is obtained by the hypervisor directly from the memory device Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
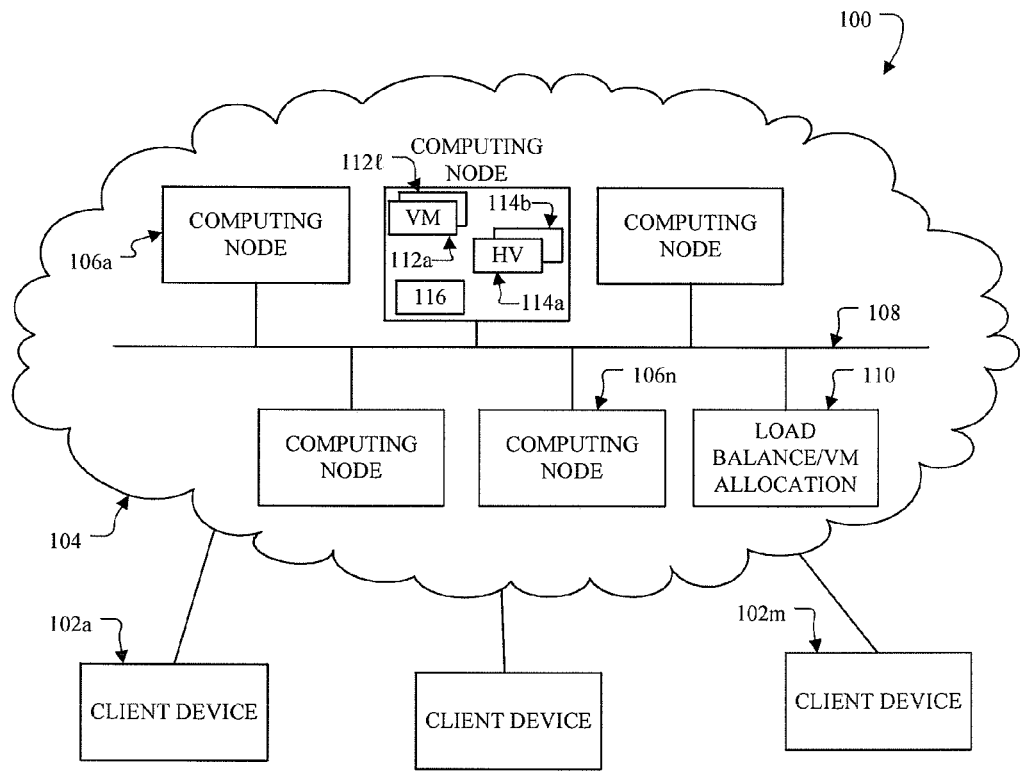
FIG. 1 illustrates an example system with a computing cloud in accordance with this disclosure.

FIG. 1 illustrates an example system 100 with a computing cloud in accordance with this disclosure. The embodiment of the system 100 shown in FIG. 1 is for illustration only. Other embodiments of the system 100 could be used without departing from the scope of this disclosure.

As shown in FIG. 1, the system 100 includes client devices 102a-102m that communicate with or form a part of a computing cloud 104. The client devices 102a-102m represent computing or communication devices that can interact with the computing cloud 104 in order to receive one or more computing services from the computing cloud 104. Any suitable client devices 102a-102m could be used in the system 100, such as desktop computers, laptop computers, tablet computers, dummy computer terminals, smartphones, and any other or additional devices that possess processing and communication capabilities. Any number of client devices could be used in the system 100.

The computing cloud 104 generally represents a cloud computing environment where applications and other software routines are executed to provide computing services to the client devices 102a-102m. The computing cloud 104 typically includes various processing devices that execute instructions in applications and other software routines. The computing cloud 104 also typically includes memory resources used to store data, network interface resources used to communicate over one or more networks, and other computing resources. An application or other software routine could be executed by a single machine within the computing cloud 104 or by multiple machines in the computing cloud 104.

In the example shown in FIG. 1, the computing cloud 104 includes multiple computing nodes 106a-106n coupled together using at least one network 108. The computing cloud 104 also includes at least one load balancing/VM allocation server 110 coupled to the at least one network 108. The computing nodes 106a-106n represent server computers or other type(s) of computing devices that execute applications and other software routines. As described in more detail below, each of the computing nodes 106a-106n can execute one or more virtual machines (VMs) 112a-112l, within a virtualization layer that is supported by multiple hypervisors (HVs) 114a-114b.

Each computing node 106a-106n includes any suitable computing resources that can be used to support the execution of applications such as virtual machines 112a-112l and hypervisors 114a-114b. For example, each computing node 106a-106n could include one or more processing devices, one or more memories, and one or more network interfaces.

The at least one network 108 facilitates communication between the computing nodes 106a-106n and other components of the system 100, such as the client devices 102a-102m. For example, the network(s) 108 may communicate Internet Protocol (IP) packets, frame relay frames, Asynchronous Transfer Mode (ATM) cells, or other information between network addresses. The network(s) 108 may include one or more local area networks (LANs), metropolitan area networks (MANs), wide area networks (WANs), all or a portion of a global network such as the Internet, or any other communication system or systems at one or more locations. Any number of networks 108 in any suitable configuration could be used. For instance, the client devices 102a-102m could access the computing cloud 104 over a public network such as the Internet, while the computing nodes 106a-106n and other components of the computing cloud 104 could communicate over one or more private LANs or other private networks.

The at least one load balancing/VM allocation server 110 performs various functions that support the use or operation of the computing cloud 104. For example, the load balancing/VM allocation server 110 can perform load balancing to distribute workloads across the computing nodes 106a-106n. Part of this functionality can include the load balancing/VM allocation server 110 selecting the computing nodes 106a-106n that are to execute various virtual machines 112a-112l requested by the client devices 102a-102m. The load balancing/VM allocation server 110 includes any suitable structure for managing or controlling the workload on multiple devices.

Each virtual machine 112a-112l, represents a virtualized computer or other software-based virtualization of a machine that can be executed for or on behalf of at least one client device 102a-102m. Each virtual machine 112a-112l could include a guest operating system and one or more additional software applications. Example guest operating systems could include LINUX, HP-UX, MICROSOFT WINDOWS SERVER, and other operating systems. Other applications within a virtual machine 112a-112l could include any suitable applications that provide desired functionality for the client devices 102a-102m. Each virtual machine 112a-112l could include one or multiple applications.

The hypervisors 114a-114b in each computing node 106a-106n generally operate to support the creation of a virtualization layer to support the execution of one or more virtual machines 112a-112l and to oversee the integrity of the virtualization layer. For example, the hypervisors 114a-114b can operate to virtualize the hardware resources of a computing node 106a-106n on which the virtual machines 112a-112l are executed. This allows the virtual machines 112a-112l to execute on different computing nodes 106a-106n with little or no regard for the different hardware configurations and resources of the computing nodes 106a-106n.

As described in more detail below, a computing node could include a monitoring hypervisor 114a, an additional hypervisor 114b, and a memory analysis application 116 (which may or may not operate within a virtual machine 112a-112t). The additional hypervisor 114b can support the virtualization layer and interact with hardware resources of the computing node. The monitoring hypervisor 114a and the memory analysis application 116 can perform functions to help verify the integrity of one or more virtual machines 112a-112l executing on the computing node. For example, the monitoring hypervisor 114a could have direct access to a memory device within a computing node and capture snapshots of the contents of the memory device. The memory analysis application 116 can use the captured snapshots to verify the integrity of the virtual machines 112a-112l. For instance, the memory analysis application 116 could perform a hashing operation using a memory snapshot of an executable region of memory to generate a unique identifier associated with a kernel or an application that a virtual machine is executing. The unique identifier can then be used to determine whether the kernel or application is approved or forbidden. In this document, a "snapshot" refers to a collection of data obtained (or allegedly obtained) from memory.

By performing these functions, a monitoring hypervisor 114a can be used to help verify that one or more virtual machines 112a-112l on a computing node 106a-106n have not been compromised. For example, a snapshot of a virtual machine's memory contents in a random access memory (RAM) or other memory could be captured by the monitoring hypervisor 114a, and the memory analysis application 116 can use the snapshot to verify the kernel and application space of the virtual machine 112a-112l. This could be done, for instance, to detect illicit kernel injections, detect malware, or verify that a virtual machine 112a-112l is executing permissible applications. If not, any suitable action(s) can take place, such as halting execution of the virtual machine 112a-112l using the monitoring hypervisor 114a or generating a notification for an administrator.

The memory analysis application 116 could receive multiple snapshots associated with one or multiple virtual machines 112a-112l. The memory analysis application 116 could also analyze the snapshots in real-time, in response to a user request, or at any other suitable times. The memory analysis application 116 could further receive snapshots from different components, not just a monitoring hypervisor 114a. For example, the memory analysis application 116 could request a memory snapshot from a virtual machine 112a-112l and from a monitoring hypervisor 114a. Since the monitoring hypervisor 114a in a computing node 106a-106n can capture a memory snapshot directly from a memory device, this allows the memory analysis application 116 to compare the snapshots or data associated with the snapshots (such as hash results) and detect if the snapshots are different. Differences could indicate that a virtual machine 112a-112l or a lower-level application is maliciously altering a memory snapshot.

Although FIG. 1 illustrates one example of a system 100 with a computing cloud 104, various changes may be made to FIG. 1. For example, the system 100 could include any number of each component in any suitable arrangement. Cloud computing networks can vary widely in configuration, and FIG. 1 does not limit the scope of this disclosure to any particular configuration. While FIG. 1 illustrates one operational environment in which the integrity of a virtual machine can be verified, this functionality could be used in any other suitable system.

Figure 2:
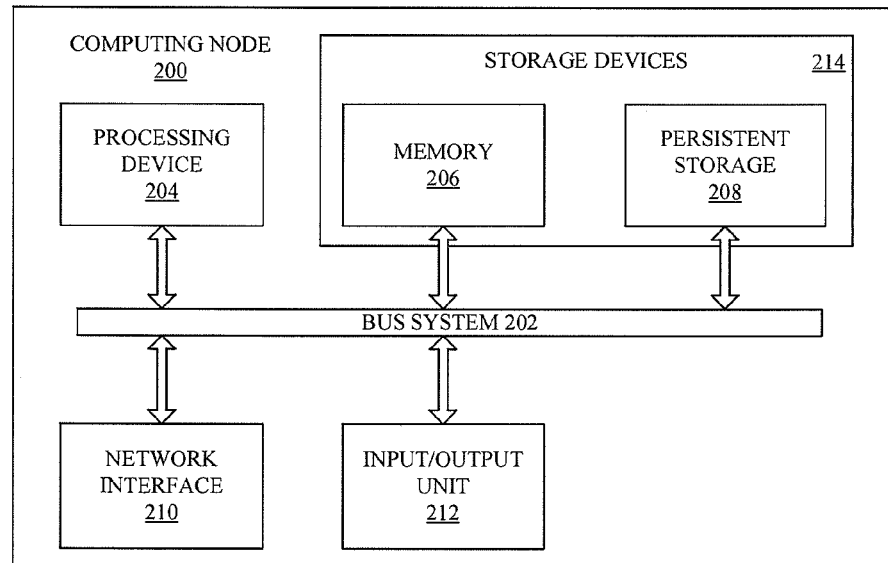
FIG. 2 illustrates an example computing node within a computing cloud in accordance with this disclosure.

FIG. 2 illustrates an example computing node 200 within a computing cloud in accordance with this disclosure. The computing node 200 could, for example, be used as the computing nodes 106a-106n in the system 100 of FIG. 1. The embodiment of the computing node 200 shown in FIG. 2 is for illustration only. Other embodiments of the computing node 200 could be used without departing from the scope of this disclosure.

As shown in FIG. 2, the computing node 200 includes a bus system 202, which supports communication between at least one processing device 204, at least one memory 206, at least one persistent storage device 208, and at least one network interface 210. At least one input/output (I/O) unit 212 could optionally be provided at the computing node 200, although the computing node 200 could also be accessed and used remotely (such as via a network interface 210) without the need for a local I/O unit 212.

The at least one processing device 204 processes instructions in software or firmware, such as software that is loaded into the memory 206. The processing device(s) 204 may include one or more microprocessors, multi-core processors, microcontrollers, field programmable gate arrays, application specific integrated circuits, discreet logic, or other type(s) of processing device(s) depending on the implementation. As a particular example, the processing devices 204 may be implemented using a number of heterogeneous processor systems in which a main processor is present with secondary processors on a single chip. As another particular example, the processing devices 204 may be a symmetric multi-processor system containing multiple processors of the same type.

The at least one memory 206 and the at least one persistent storage device 208 are examples of storage devices 214. A storage device is any piece of hardware capable of storing information, such as data, program code, and/or other suitable information on a temporary or permanent basis. The memory or memories 206 here may include, for example, a random access memory or any other suitable volatile and/or non-volatile storage device(s). The persistent storage device(s) 208 may contain one or more components or devices such as a read-only memory, hard drive, Flash memory, optical drive, or any other type(s) of persistent storage device(s). The media used by a persistent storage device 208 may be removable, such as when a removable hard drive is used as the persistent storage device 208.

The at least one network interface 210 supports communication with other systems or devices. For example, a network interface 210 could include a network interface card or a wireless transceiver. A network interface 210 may support the exchange of any suitable information, such as data associated with execution of a virtual machine or a hypervisor. Each network interface 210 may support communication through one or more physical or wireless communications links.

The at least one I/O unit 212 allows for input and/or output of data using other devices that may be connected to the computing node 200. For example, an I/O unit 212 may provide a connection for user input through a keyboard, mouse, or other suitable input device(s). The I/O unit 212 may also send output data to a display, printer, or other suitable output device(s).

Program code for an operating system, applications, or other programs can be stored in one or more of the storage devices 214, provided to the processing device(s) 204, and executed by the processing device(s) 204. The applications executed by the processing device(s) 204 can include applications implementing hypervisors and virtual machines. Example details regarding the use of hypervisors and virtual machines are described below with respect to FIGS. 3 through 6. These details can be implemented within the computing node 200.

Although FIG. 2 illustrates one example of a computing node 200 within a computing cloud, various changes may be made to FIG. 2. For example, as with computing clouds, computing nodes can vary widely in configuration, and FIG. 2 does not limit the scope of this disclosure to any particular configuration. While FIG. 2 illustrates one example of a computing node that can operate within a cloud computing environment, any other suitable computing node(s) could be used.

Figure 3:
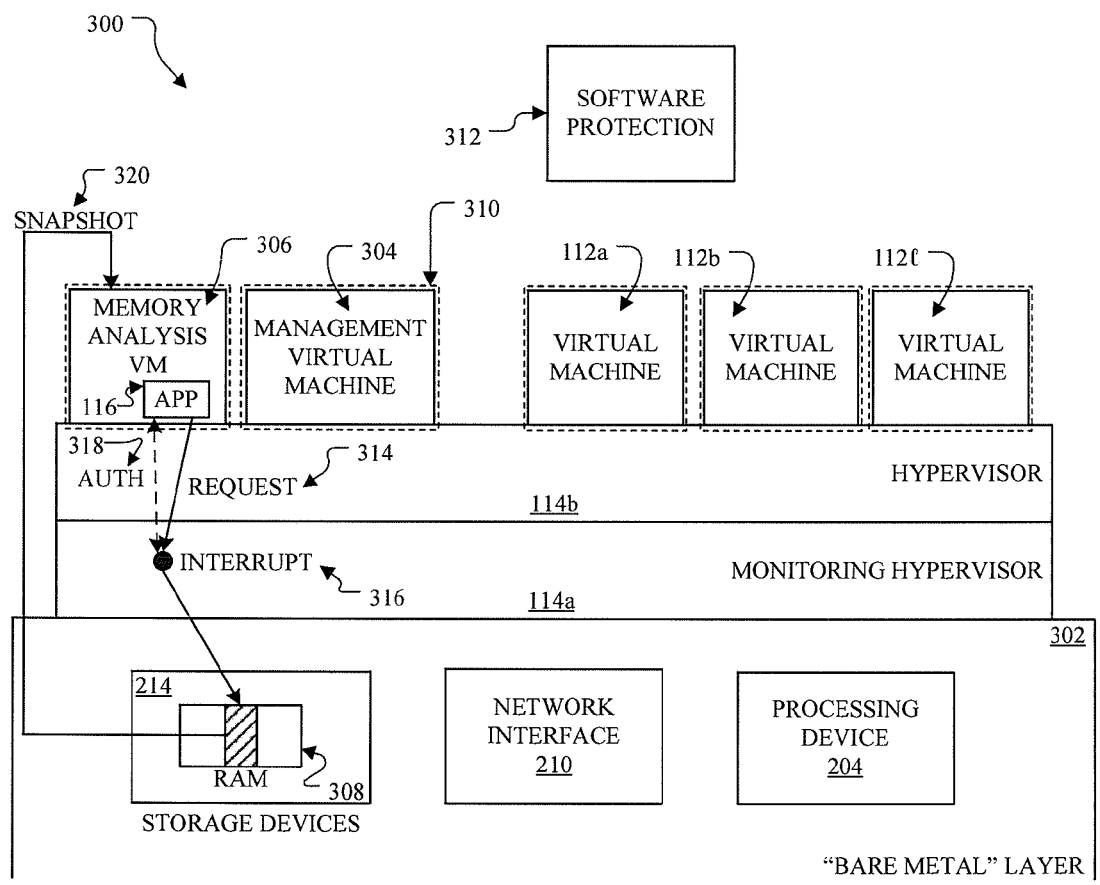
FIG. 3 illustrates an example functional architecture supporting a technique for verifying virtual machine integrity using hypervisor-based memory snapshots in accordance with this disclosure.

FIG. 3 illustrates an example functional architecture 300 supporting a technique for verifying virtual machine integrity using hypervisor-based memory snapshots in accordance with this disclosure. The embodiment of the functional architecture 300 shown in FIG. 3 is for illustration only. Other embodiments of the functional architecture could be used without departing from the scope of this disclosure. Also, for ease of explanation, the functional architecture 300 shown in FIG. 3 is described with respect to the computing node 200 of FIG. 2 operating in the system 100 of FIG. 1. The functional architecture 300 shown in FIG. 3 could be used with any other computing node and in any other system.

As shown in FIG. 3, a "bare metal" layer 302 represents the physical computing resources of an underlying computing node 200. The "bare metal" layer 302 here includes the various processing devices 204, storage devices 214, and network interfaces 210 of the computing node 200. The "bare metal" layer 302 could include any other computing resources in a computing cloud or a computing node.

The monitoring hypervisor 114a and the additional hypervisor 114b are executed by or otherwise implemented with the computing node 200. The hypervisor 114b generally supports the creation and management of a virtualization layer in which one or more virtual machines can be executed. The hypervisor 114b also generally supports interactions between those virtual machines and the computing resources in the underlying "bare metal" layer 302.

The monitoring hypervisor 114a can monitor the operation of the virtual machine(s) and the hypervisor 114b to thereby oversee the integrity of the virtualization layer. For example, the monitoring hypervisor 114a could capture memory snapshots of the memory space used by one or more virtual machines 112a-112l to support real-time behavior-based malware detection. Details of example monitoring hypervisors and example techniques for detecting malware using monitoring hypervisors can be found in U.S. patent application Ser. No. 13/770,664 and U.S. patent application Ser. No. 13/888,849, both of which are hereby incorporated by reference in their entirety. In this example, the monitoring hypervisor 114a can logically operate between the bare metal layer 302 and the hypervisor 114b.

Each hypervisor 114a-114b can be implemented in any suitable manner. For example, each hypervisor 114a-114b could include software/firmware instructions executed by at least one processing device. In some embodiments, the hypervisor 114a represents a "Type 1" hypervisor, and the hypervisor 114b represents a "Type 1" or "Type 2" hypervisor. A "Type 1" hypervisor represents a hypervisor run or executed directly on the underlying hardware of a computing node in order to control the hardware. A "Type 2" hypervisor represents a hypervisor run or executed between the operating system of a computing node and one or more guest operating systems in one or more virtual machines. In other words, a "Type 2" hypervisor runs within the environment created by the operating system of a computing node, while a "Type 1" hypervisor is not limited in this manner. Examples of available hypervisors that could be used as the hypervisor 114a and/or the hypervisor 114b (after augmented to support the functionality described in this patent document) include the XEN hypervisor from CITRIX SYSTEMS, INC., the ESXI hypervisor from VMWARE, INC., and the KVM hypervisor from RED HAT, INC.

In the example shown in FIG. 3, different types of virtual machines are executed on the computing node 200. For example, the computing node 200 could execute the one or more virtual machines 112a-112l. The virtual machines 112a-112l represent virtual machines used to provide one or more services to the client devices 102a-102m. The virtual machines 112a-112l could be created and controlled by the organization operating the computing cloud 104, by the owners/operators of the client devices 102a-102m, or in any other suitable manner. Each virtual machine 112a-112l can include a guest operating system and one or more applications.

The computing node 200 could also execute a management virtual machine 304. The management virtual machine 304 can perform various functions used to manage the operation of the computing node 200. The functions of the management virtual machine 304 may not necessarily be intended to directly provide functionality to the client devices 102a-102m but rather to manage the computing node 200 or support execution of the virtual machines 112a-112l. Example management functions could include memory management and network management.

In addition, the computing node 200 could execute a memory analysis virtual machine 306 that includes the memory analysis application 116. The memory analysis virtual machine 306 performs memory analysis operations to detect malware and other security threats associated with the computing node 200. For example, the virtual machine 306 could analyze snapshots of data contained within a random access memory (RAM) 308 of the computing node 200 during live analysis. The virtual machine 306 could also store snapshots of the RAM 308 for later forensic or other analysis. The snapshots used by the virtual machine 306 are captured by the underlying monitoring hypervisor 114a. In some embodiments, the virtual machine 306 could analyze the contents of the RAM 308 to enforce a whitelist identifying software that can be executed by the computing node 200 or a blacklist identifying software that cannot be executed by the computing node 200. The memory analysis virtual machine 306 includes any suitable logic for analyzing memory, such as the SECOND LOOK tool from RAYTHEON PIKEWERKS CORP.

The dashed lines 310 around the virtual machines in FIG. 3 represent encryption protection provided to the virtual machines by a software protection module 312. One, some, or all of the virtual machines executed by the computing node 200 could receive software protection. The software protection module 312 can be used to help provide clean and secure guest operating systems to the client devices 102a-102m and to protect the confidentiality and integrity of the virtual machines. Any suitable encryption technology could be used. In some embodiments, the software protection module 312 could include software or firmware executed in any suitable manner, such as directly on the bare metal layer 302, within the monitoring hypervisor 114a, within the hypervisor 114b, within the virtual machines 112a-112l, or as a separate virtual machine.

As shown in FIG. 3, the memory analysis virtual machine 306 includes the memory analysis application 116. The application 116 can be used to support interaction with the monitoring hypervisor 114a and implement one or more memory analysis functions. Additional details regarding the operation of the memory analysis application 116 and the monitoring hypervisor 114a in a computing node 200 are shown in FIGS. 4 through 6.

Note that the various components shown in FIG. 3 could be implemented in any suitable manner. For example, each of the components 112a-112l, 114a-114b, 116, 304-306, 312 could be implemented using software/firmware that is executed by the processing device(s) 204 of the computing node 200.

Although FIG. 3 illustrates one example of a functional architecture 300 supporting a technique for verifying virtual machine integrity using hypervisor-based memory snapshots, various changes may be made to FIG. 3. For example, the computing node 200 could include any number(s) and type(s) of resources in the bare metal layer 302, and the computing node 200 could execute any number(s) and type(s) of virtual machines. Also, while the use of snapshots of a RAM 308 is shown here, memory snapshots can be captured of any other suitable memory.

Figure 4:
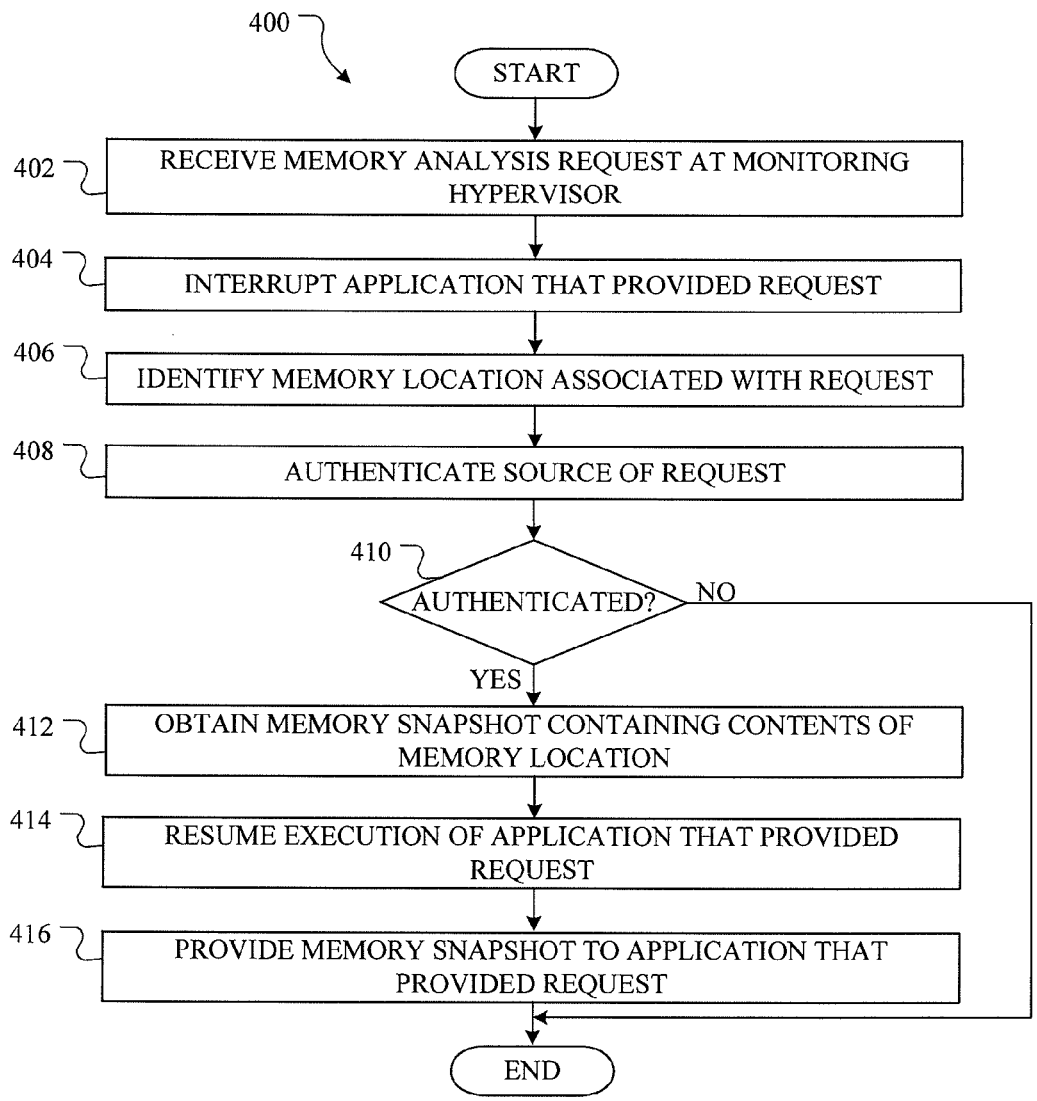
FIGS. 4 and 5 illustrate example methods for verifying virtual machine integrity using hypervisor-based memory snapshots in accordance with this disclosure.
Figure 5:
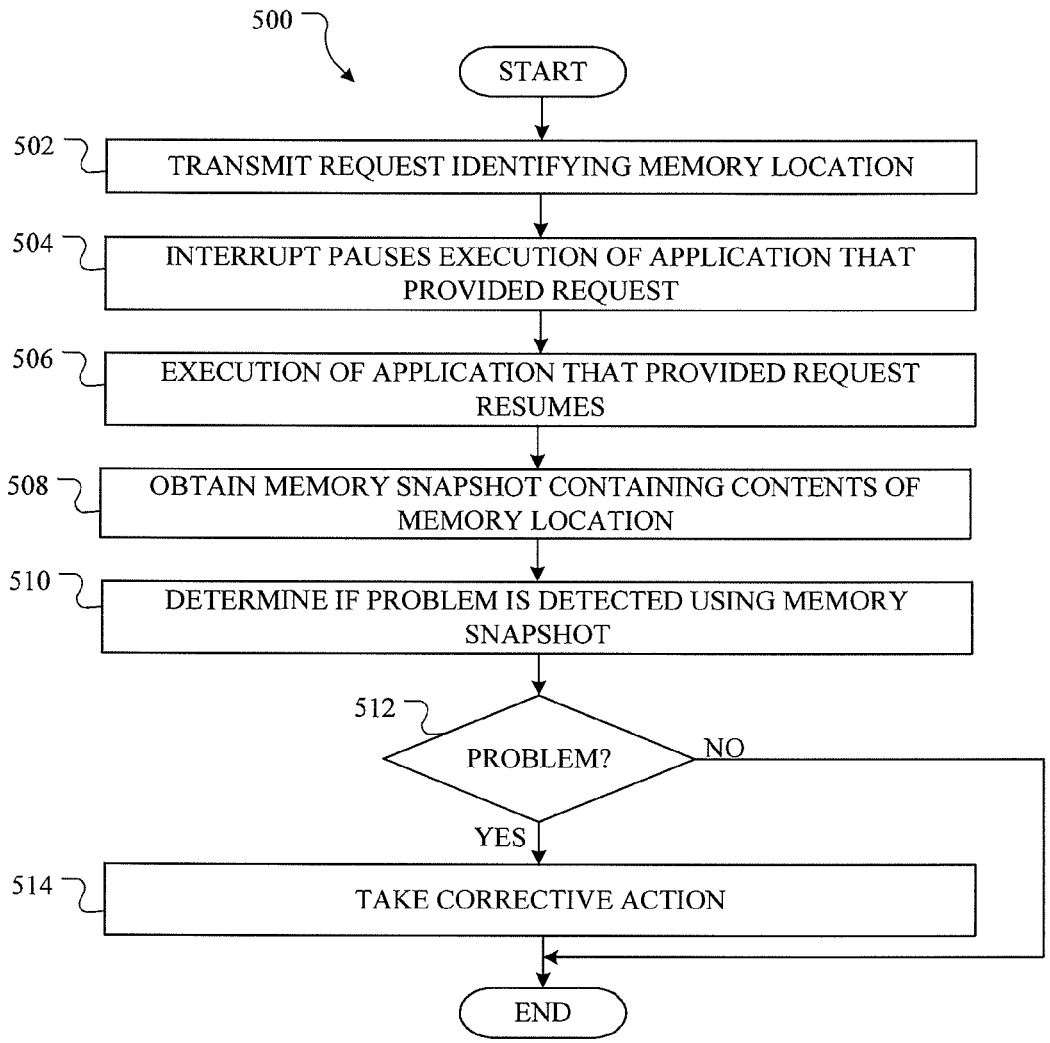

FIGS. 4 and 5 illustrate example methods for verifying virtual machine integrity using hypervisor-based memory snapshots in accordance with this disclosure. More specifically, FIG. 4 illustrates an example method 400 that could be performed by the monitoring hypervisor 114a, and FIG. 5 illustrates an example method 500 that could be performed by the memory analysis virtual machine 306. The embodiments of the methods 400 and 500 shown in FIGS. 4 and 5 are for illustration only. Other embodiments of the methods 400 and 500 could be used without departing from the scope of this disclosure. Also, for ease of explanation, the methods 400 and 500 are described with respect to the computing node 200 of FIG. 2 using the functional architecture 300 of FIG. 3 and operating in the system 100 of FIG. 1. The methods 400 and 500 could be used with any other computing node, functional architecture, and system.

As shown in FIG. 4, a request is received at a monitoring hypervisor at step 402. This could include, for example, the monitoring hypervisor 114a receiving a request message 314 from the application 116 in the memory analysis virtual machine 306 as shown in FIG. 3. The request message 314 represents an indication that the application 116 wishes to analyze the memory space of a virtual machine (such as a virtual machine 112a-112l) and wants to receive a memory snapshot of that virtual machine's memory space. The request message 314 can include various information from the memory analysis virtual machine 306, such as an identification of a memory block or other memory location to be captured by the monitoring hypervisor 114a. The memory location could, for instance, represent a block of memory allocated to a particular virtual machine being monitored by the memory analysis virtual machine 306.

Execution of the application that provided the request is interrupted at step 404. This could include, for example, the monitoring hypervisor 114a generating an interrupt 316 as shown in FIG. 3. This pauses the execution of the application 116 by the computing node 200 and allows the monitoring hypervisor 114a time to capture a memory snapshot for the application 116.

A memory location is retrieved from the request at step 406. This could include, for example, the monitoring hypervisor 114a identifying a block of memory in the RAM 308 or other memory location identified in the request message 314.

A source of the request is authenticated at step 408. This could include, for example, the monitoring hypervisor 114a performing an authentication operation 318 with the memory analysis application 116 or the memory analysis virtual machine 306 as shown in FIG. 3. Any suitable authentication technique could be used here. For example, the application 116 could provide a digital certificate or a pointer identifying a digital certificate. The monitoring hypervisor 114a could also determine whether the request message 314 was obtained from a memory address "owned" by the application 116. The monitoring hypervisor 114a could further examine an instruction pointer of the processing device 204 and determine if the processing device 204 was executing code of the virtual machine 306 or the application 116 at the time that the request message 314 was issued. Note that the authentication operation 318 could be separate from or form a part of other steps in FIG. 4. For instance, the request message 314 could include a certificate or a pointer to a certificate of the application 116 or the memory analysis virtual machine 306, or the certificate or the pointer to the certificate could be sent to the monitoring hypervisor 114a separate from the request message 314.

If the source is not authenticated at step 410, the method 400 may end. In this case, the monitoring hypervisor 114a has determined that it received an invalid request, and the monitoring hypervisor 114a can take any suitable action (such as discarding the request, warning an operator, triggering an alarm, ignoring future requests from the message source, or disabling execution of the message source).

If the source is authenticated at step 410, the monitoring hypervisor obtains a memory snapshot containing the contents of the identified memory location at step 412. This could include, for example, the monitoring hypervisor 114a reading the memory space associated with the request message 314 in order to create a memory snapshot 320. In this example, the memory space is located within the RAM 308, although it could be located in some other type of storage device. The monitoring hypervisor 114a here can read the memory space directly from a memory device without the data passing through any other intervening applications (which could be compromised and provide a false snapshot).

Execution of the application that provided the request is resumed at step 414, and the memory snapshot is provided to the application that sent the request at step 416. This could include, for example, the monitoring hypervisor 114a advancing the instruction pointer for the application 116 to the next instruction of the application 116 and allowing the processing device 204 to resume execution of the thread for the application 116. This could also include the monitoring hypervisor 114a providing the memory snapshot 320 to the memory analysis application 116 directly, indirectly via a memory storage location (such as in the RAM 308), or in any other suitable manner.

As shown in FIG. 5, a request identifying a memory location is transmitted at step 502. This could include, for example, the memory analysis application 116 in the memory analysis virtual machine 306 transmitting a request message 314, such as when the application 116 needs to analyze the memory contents of a virtual machine. The request message 314 could include a memory address in the RAM 308 or other suitable location. An interrupt pauses execution of the application that provided the request at step 504, and after some period of time execution of the application that provided the request resumes at step 506.

A memory snapshot captured by a monitoring hypervisor is obtained at step 508. This could include, for example, the application 116 receiving the memory snapshot 320 from the RAM 308, from the monitoring hypervisor 114a, or in any other suitable manner. The memory snapshot 320 represents a direct view of the monitoring hypervisor 114a into the memory space identified in the request message 314.

A determination is made whether a problem is detected using the memory snapshot at step 510. If no problem is detected at step 512, the method 500 could end. In this case, the memory snapshot 320 could be discarded or saved for later use. Otherwise, if a problem is detected at step 512, corrective action can be taken at step 514. This could include, for example, the application 116 requesting that the monitoring hypervisor 114a disable execution of the virtual machine whose memory is being analyzed, generating a warning for an operator, or triggering an alarm.

Any suitable analysis of a memory snapshot could occur in step 510. For example, the memory analysis application 116 could perform a hashing operation using a current memory snapshot 320 of a virtual machine's kernel or application space and compare the hash result to hashes of known "good" memory snapshots. If no match is found, this could indicate that changes have been made to code, such as an injection of malicious code into a kernel or application. The memory analysis application 116 could also compare the hash result against hashes of authorized applications to verify that a virtual machine is permitted to execute a particular application (enforcing a whitelist) or against hashes of unauthorized applications to determine whether execution of a particular application is forbidden (enforcing a blacklist). In addition, the memory analysis application 116 could compare a hash result for a memory snapshot 320 received from the hypervisor 114a against a hash result for a memory snapshot of the same memory space received from a virtual machine. The memory analysis application 116 could determine whether the virtual machine has an accurate view of its memory contents. Any other or additional analyses could be performed by the memory analysis application 116, whether or not those analyses involve hashing operations.

A known "good" state of a virtual machine's memory could be identified in any suitable manner. For example, the memory analysis virtual machine 306 could have access to reference hash results for different images of known good kernels with various extensions. When a new virtual machine is created, its kernel and extensions can be identified to the memory analysis virtual machine 306 so that the virtual machine 306 knows which reference hash result is to be compared to hashes of later snapshots of the new virtual machine. The selection of the appropriate reference hash result could also be done, automatically, such as based on information obtained from a virtual machine or a user. Hashes for a large number of "good" kernel images could be supported by the memory analysis virtual machine 306. A similar process could occur with applications that are installed on virtual machines. As another example, the memory analysis virtual machine 306 could capture one or more snapshots of a virtual machine's memory space when an administrator or other user indicates that the virtual machine is operating in a known good state. The virtual machine 306 could then use those snapshots as a baseline for later comparisons against the virtual machine's memory space.

In this manner, the monitoring hypervisor 114a can be used to obtain snapshots directly into a memory of a computing node. This reduces or eliminates the likelihood that a malicious program could effectively "hide itself" by returning false snapshots of a virtual machine's memory space.

Note that while a single request message 314 is shown in FIG. 3 and described in FIGS. 4 and 5, multiple messages 314 could be provided by the application 116 and received by the monitoring hypervisor 114a. For example, an application 116 could provide a request message 314 each time the application 116 attempts to analyze the memory space of a virtual machine. This can be done continuously, periodically, randomly, or in any other suitable manner for any number of virtual machines.

Although FIGS. 4 and 5 illustrate examples of methods 400 and 500 for verifying virtual machine integrity using hypervisor-based memory snapshots, various changes may be made to FIGS. 4 and 5. For example, while each figure shows a series of steps, various steps in each figure could overlap, occur in parallel, occur in a different order, or occur any number of times.

In some embodiments, various functions described above (such as functions of the various hypervisors, software protection modules, and virtual machines) are implemented or supported by computer programs, each of which is formed from computer readable program code and embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a request at a first hypervisor from an application, the application and the first hypervisor executed by a computing node, wherein the request identifies a memory location in a memory device of the computing node, the memory location associated with a virtual machine executed by the computing node and managed by a second hypervisor also executed by the computing node;
   interrupting execution of the application prior to obtaining a snapshot of contents of the memory location in the memory device;
   obtaining the snapshot of the contents of the memory location in the memory device, the snapshot obtained by the first hypervisor directly from the memory device;
   resuming execution of the application after obtaining the snapshot; and
   providing the snapshot to the application.

2. The method of claim 1, further comprising:
   analyzing the snapshot using the application to detect a problem with the virtual machine.

3. The method of claim 2, wherein analyzing the snapshot comprises performing a hashing operation using the snapshot.

4. The method of claim 3, wherein analyzing the snapshot further comprises comparing a result of the hashing operation to at least one of:
   hash results associated with known good images of kernels;
   hash results associated with authorized applications; and
   hash results associated with unauthorized applications.

5. The method of claim 2, wherein analyzing the snapshot comprises:
   obtaining a second snapshot of the contents of the memory location from the virtual machine; and
   comparing the snapshots or data generated using the snapshots to verify whether at least one of the snapshots has been altered.

6. The method of claim 1, wherein:
   the request comprises one of multiple requests received at the first hypervisor from the application, the multiple requests identifying different memory locations in the memory device, the different memory locations associated with different virtual machines executed by the computing node; and the method includes obtaining a snapshot for each of the requests and providing each snapshot to the application.

7. The method of claim 1, further comprising:
suspending execution of the virtual machine using the first hypervisor in response to the virtual machine executing an impermissible application.

8. The method of claim 1, further comprising:
authenticating a source of the request at the first hypervisor.

9. The method of claim 1, wherein the application foul's part of a second virtual machine, the second virtual machine executed by the computing node.

10. An apparatus comprising:
at least one memory; and
at least one processing device configured to execute a virtual machine, a first hypervisor, a second hypervisor, and an application, the second hypervisor configured to manage the virtual machine, wherein the at least one processing device is configured when executing the first hypervisor to:
  receive at the first hypervisor a request from the application, wherein the request identifies a memory location in the at least one memory, the memory location associated with the virtual machine;
  interrupt execution of the application prior to obtaining a snapshot of contents of the memory location in the at least one memory;
  obtain the snapshot of the contents of the memory location in the at least one memory directly from the at least one memory;
  resume execution of the application after obtaining the snapshot; and
  provide the snapshot to the application.

11. The apparatus of claim 10, wherein the at least one processing device is configured when executing the application to analyze the snapshot to detect a problem with the virtual machine.

12. The apparatus of claim 11, wherein the at least one processing device is configured to analyze the snapshot by:
  performing a hashing operation using the snapshot; and
  comparing a result of the hashing operation to at least one of:
    hash results associated with known good images of kernels;
    hash results associated with authorized applications; and
    hash results associated with unauthorized applications.

13. The apparatus of claim 11, wherein the at least one processing device is configured to analyze the snapshot by:
  obtaining a second snapshot of the contents of the memory location from the virtual machine; and
  comparing the snapshots or data generated using the snapshots to verify whether at least one of the snapshots has been altered.

14. The apparatus of claim 10, wherein the at least one processing device is configured when executing the first hypervisor to suspend execution of the virtual machine in response to the virtual machine executing an impermissible application.

15. The apparatus of claim 10, wherein the at least one processing device is configured to execute the application within a second virtual machine.

16. A non-transitory computer readable medium storing computer readable program code that when executed causes a computing node to:
  receive a request at a first hypervisor from an application, the application and the first hypervisor executed by the computing node, wherein the request identifies a memory location in a memory device of the computing node, the memory location associated with a virtual machine executed by the computing node and managed by a second hypervisor also executed by the computing node;
  interrupt execution of the application prior to obtaining a snapshot of contents of the memory location in the memory device;
  obtain the snapshot of the contents of the memory location in the memory device, the snapshot obtained by the first hypervisor directly from the memory device;
  resume execution of the application after obtaining the snapshot; and
  provide the snapshot to the application.

17. The computer readable medium of claim 16, wherein the computer readable medium further stores computer readable program code that when executed causes the computing node to analyze the snapshot using the application to detect a problem with the virtual machine.

18. The computer readable medium of claim 17, wherein the computer readable program code that when executed causes the computing node to analyze the snapshot comprises computer readable program code that when executed causes the computing node to perform a hashing operation using the snapshot.

19. The computer readable medium of claim 16, wherein the computer readable medium further stores computer readable program code that when executed causes the computing node to authenticate the application prior to providing the snapshot to the application.

20. The method of claim 1, wherein the first hypervisor logically operates between a bare metal layer of the computing node and the second hypervisor.

21. The apparatus of claim 10, wherein the first hypervisor is configured to logically operate between a bare metal layer of the apparatus and the second hypervisor.

* * * * *